(12) United States Patent
Wu

(10) Patent No.: US 12,251,012 B2
(45) Date of Patent: Mar. 18, 2025

(54) COMBING DEVICE

(71) Applicant: NINGBO ICLIPPER ELECTRIC APPLIANCE CO., LTD., Zhejiang (CN)

(72) Inventor: Haoze Wu, Zhejiang (CN)

(73) Assignee: NINGBO CLIPPER ELECTRIC APPLIANCE CO., LTD.

( * ) Notice: Subject to any disclaimer, the term of this patent is extended or adjusted under 35 U.S.C. 154(b) by 23 days.

(21) Appl. No.: 17/989,209

(22) Filed: Nov. 17, 2022

(65) Prior Publication Data
US 2024/0032679 A1    Feb. 1, 2024

(30) Foreign Application Priority Data
Jul. 28, 2022   (CN) .......................... 202221967977.7

(51) Int. Cl.
*A46B 7/02* (2006.01)
*A01K 13/00* (2006.01)
(52) U.S. Cl.
CPC ............ *A46B 7/023* (2013.01); *A01K 13/002* (2013.01); *A46B 2200/1093* (2013.01)
(58) Field of Classification Search
CPC .................................................. A01K 13/002
USPC ....................................... 15/402, 415.1, 422
See application file for complete search history.

(56) References Cited

U.S. PATENT DOCUMENTS

| | | | | |
|---|---|---|---|---|
| 253,522 A | * | 2/1882 | Egerton ................ | A01K 13/002 119/628 |
| 380,250 A | * | 3/1888 | Dietz ................... | A01K 13/002 119/628 |
| 472,521 A | * | 4/1892 | Burnett et al. ........ | A01K 13/002 119/629 |
| 588,352 A | * | 8/1897 | Powell ................. | A01K 13/002 15/236.08 |
| 638,305 A | * | 12/1899 | Wightman ........... | A01K 13/002 15/105 |
| 5,267,528 A | * | 12/1993 | Murieen, Sr. ........ | A01K 13/002 119/628 |

(Continued)

FOREIGN PATENT DOCUMENTS

| | | | | |
|---|---|---|---|---|
| CN | 107047362 A | * | 8/2017 | .......... A01K 13/002 |
| DE | 202007016178 U1 | * | 5/2008 | .......... A01K 13/002 |
| KR | 101863070 B1 | * | 5/2018 | |

OTHER PUBLICATIONS

Merged translation of DE_202007016178 (Year: 2008).*
Merged translation of CN_107047362 (Year: 2017).*
Merged translation of KR_101863070 (Year: 2018).*

*Primary Examiner* — Morgan T Jordan
(74) *Attorney, Agent, or Firm* — Jose Cherson Weissbrot

(57) ABSTRACT

A combing device that includes a comb handle, a comb head and a protecting member; an air duct is arranged in the comb handle; the comb head is slidably arranged at an upper end of the comb handle, the comb handle is provided with a first limiting structure for preventing the comb head from sliding out from the comb handle, and the comb head is provided with a plurality of groups of comb teeth; the protecting member is connected with the front end of the comb handle; the protecting member is provided with an air suction port in communication with the air duct, and the protecting member is provided with a channel for allowing the comb teeth to pass through; an elastic member is arranged between the comb handle and the comb head.

10 Claims, 7 Drawing Sheets

(56) References Cited

U.S. PATENT DOCUMENTS

| | | | | |
|---|---|---|---|---|
| 6,427,633 B1* | 8/2002 | Ogden | A01K 13/002 |
| | | | 119/600 |
| 6,513,457 B2* | 2/2003 | Huddleston | A01K 13/002 |
| | | | 119/664 |
| 2003/0172947 A1* | 9/2003 | Wang | A46B 7/023 |
| | | | 132/119 |
| 2006/0207623 A1* | 9/2006 | Kung | A01K 13/002 |
| | | | 132/121 |
| 2010/0122663 A1* | 5/2010 | Fernandez | A01K 13/002 |
| | | | 119/664 |
| 2010/0294207 A1* | 11/2010 | Dyson | A01K 13/00 |
| | | | 15/415.1 |
| 2010/0294208 A1* | 11/2010 | Dyson | A47L 9/0653 |
| | | | 15/415.1 |
| 2010/0294210 A1* | 11/2010 | Dyson | A47L 9/0653 |
| | | | 15/415.1 |
| 2011/0030620 A1* | 2/2011 | Jouan | A01K 13/002 |
| | | | 119/611 |
| 2011/0297101 A1* | 12/2011 | Fernandez | A01K 13/002 |
| | | | 119/603 |
| 2017/0295753 A1* | 10/2017 | Cathaud | A46B 7/023 |
| 2021/0177131 A1* | 6/2021 | Jacobowitz | G02B 6/001 |
| 2022/0217942 A1* | 7/2022 | McClain | A46B 7/046 |
| 2022/0386565 A1* | 12/2022 | Pan | A01K 13/002 |
| 2023/0301271 A1* | 9/2023 | Zhong | A46B 5/0033 |

* cited by examiner

COMBING DEVICE

TECHNICAL FIELD

This invention generally relates to the technical field of pet supplies, and more particularly, to a combing device.

BACKGROUND

To provide better care for pets, various pet tools for grooming pets (e.g., a pet comb) are sold on the market. Presently, most combs used for grooming pets requires manual removal of pet hair wound on the comb, which is laborious and time-consuming, resulting in poor user experience.

In its normal state, the comb teeth of conventional pet combs are exposed. Therefore, the comb teeth are easily bent, leading to a dysfunctional product.

SUMMARY

The purpose of the present invention is to provide a combing device. Through the arrangement of a protecting member, when the combing device is no longer used, the comb teeth of the comb head are hidden between the protecting member and the comb head, thereby preventing the comb teeth from being bent due to external force.

To achieve the above purpose, the present invention adopts the following technical solution: a combing device, comprising a comb handle, a comb head and a protecting member; an air duct is arranged in the comb handle; the comb head is slidably arranged at an upper end of the comb handle, the comb handle is provided with a first limiting structure for preventing the comb head from sliding out from the comb handle, and the comb head is provided with a plurality of groups of comb teeth; the protecting member is connected to the comb handle and is arranged at the front end of a corresponding comb head; the protecting member is provided with an air suction port in communication with the air duct, and the protecting member is provided with a channel for allowing the comb teeth to pass through; an elastic member is arranged between the comb handle and the comb head; the comb head possesses a tendency to move away from one side of the protecting member under the action of the elastic member, thereby allowing the comb teeth to be hidden between the protecting member and the comb head; the combing device further comprises a locking structure for locking the comb head at a position where the comb teeth just appear from the channel; the locking structure is provided with a push button; through the reciprocating movement of the push button, the locking and unlocking of the locking structure is achieved.

In another embodiment of the present invention, the locking structure comprises a locking block, and the comb handle is provided with a lock groove. The locking block is arranged at the rear end of the comb head and is capable of interacting with the locking groove to lock the comb head at a position where the comb teeth just appear from the channel.

In another embodiment of the present invention, the push button is connected to the locking block, and the rear side of the comb head is provided with a push button groove for interacting with the push button in a sliding manner. Through the reciprocating movement of the push button, the locking block and the locking groove are locked to or unlocked from each other.

In another embodiment of the present invention, the push button is connected to the locking block through a connecting portion, and the comb head is provided with a via hole for allowing the connecting portion to extend into the comb head. Two sides of the push button or the connecting portion are provided with buckles for interacting with end portions of the comb head in a limiting manner.

In another embodiment of the present invention, the locking structure is provided with a second limiting structure for limiting the lateral movement of the push button and the locking block.

In another embodiment of the present invention, the comb head comprises a mounting plate and a comb base, wherein the comb base is fixedly mounted on the mounting plate, and the comb teeth are fixedly arranged on the comb base. A through hole in communication with the air duct is formed at a position where the mounting plate and the comb base correspond to the air duct.

In another embodiment of the present invention, the comb head comprises a pressing plate, which allows the comb base to be pressed on the mounting plate. The pressing plate, the comb base and the mounting plate are fixedly connected into a whole through fasteners. A through slot for allowing the comb teeth to pass through is provided at a position where the pressing plate corresponds to the comb teeth.

In another embodiment of the present invention, guiding columns are arranged on two sides of the comb head, and the comb handle is provided with guiding grooves for interacting with the guiding columns. Through the interaction between the guiding columns and the guiding grooves, a sliding path when the comb head slides relative to the comb handle is defined.

In another embodiment of the present invention, the elastic member is sleeved on the periphery of the guiding column. One end of the elastic member abuts against the comb handle, and another end of the elastic member abuts against the comb head.

In another embodiment of the present invention, the first limiting structure further comprises a limiting ring and a limiting step. The limiting ring is arranged in a radial direction at a position where the comb handle corresponds to the guiding groove, and the guiding column is provided with a limiting step for interacting with the limiting ring in a limiting manner.

In another embodiment of the present invention, a mounting panel is arranged at a position where the comb head corresponds to the push button. A connecting plate is arranged on an inner side of the mounting panel, and the connecting plate is fixedly connected to the push button located on an outer side of the mounting panel by means of a fastening member, which allows the mounting panel to be limited between the connecting plate and the push button. The mounting panel is provided with a first avoiding groove for allowing the fastening member to slide and a second avoiding groove for allowing the locking block to slide.

Compared with the prior art, the present invention has the following advantages:

1. Through the arrangement of a protecting member, when the combing device is no longer used, the comb teeth of the comb head are hidden between the protecting member and the comb head, thereby preventing the comb teeth from being bent due to collision;
2. By means of the locking structure, when there is a need to use the combing device, the push button is pushed forward to enable the locking block to insert into the locking groove, thereby locking the comb head at a position where the comb teeth just appear from the channel; during use, the comb teeth of the comb head are always kept in a state of appearing from the channel; when the combing device is no longer used, the push button is reversely pushed to enable the locking block and the locking groove to be unlocked from each other; in this way, the comb head slides toward a side far away from the protecting member under the elastic force of the elastic member, so that the comb teeth of the comb head are hidden between the protecting member and the comb head;

3. Normally, the comb teeth are capable of smoothly combing hair; when there is a need to remove the residual hair wound among the comb teeth, the push button is pushed such that the locking block and the locking groove are unlocked from each other; at this point, the comb head reciprocates relative to the comb handle and the protecting member under the elastic force of the elastic member, thereby enabling the residual hair wound on the comb teeth to be removed by the protecting member through the reciprocating movement of the comb head; thus, a convenient removal of residual hair is achieved.

In Figures: 1—Comb Handle, 11—Air Duct, 12—Locking Groove, 13—Guiding Groove, 14—Limiting Ring, 2—Comb Head, 21—Mounting Plate, 22—Comb Base, 221—Comb Tooth, 23—Pressing Plate, 24—Push Button Groove, 25—Through Hole, 26—Guiding Column, 261—Limiting Step, 27—Mounting Panel, 271—The First Avoiding Groove, 272—The Second Avoiding Groove, 28—Comb Frame, 281—Sliding Gap, 3—Protecting Member, 31—Air Suction Port, 32—Channel, 4—Elastic Member, 5—Locking Member, 51—Locking Block, 52—Push Button, 53—Connecting Portion, 54—Buckle, 55—Connecting Column, 6—Connecting Plate, 7—Fastening Member.

DETAILED DESCRIPTION

Drawings are combined hereinafter to elaborate the technical solution of the present invention.

Figure 1:
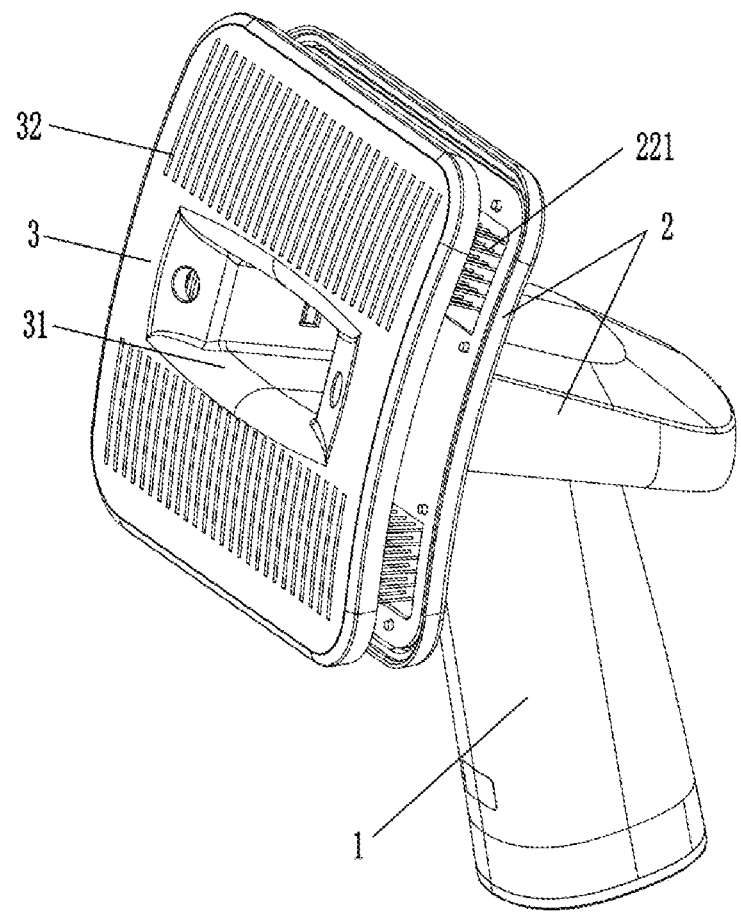
FIG. 1 is a conceptual diagram illustrating an exemplary structure of the present invention.
Figure 2:
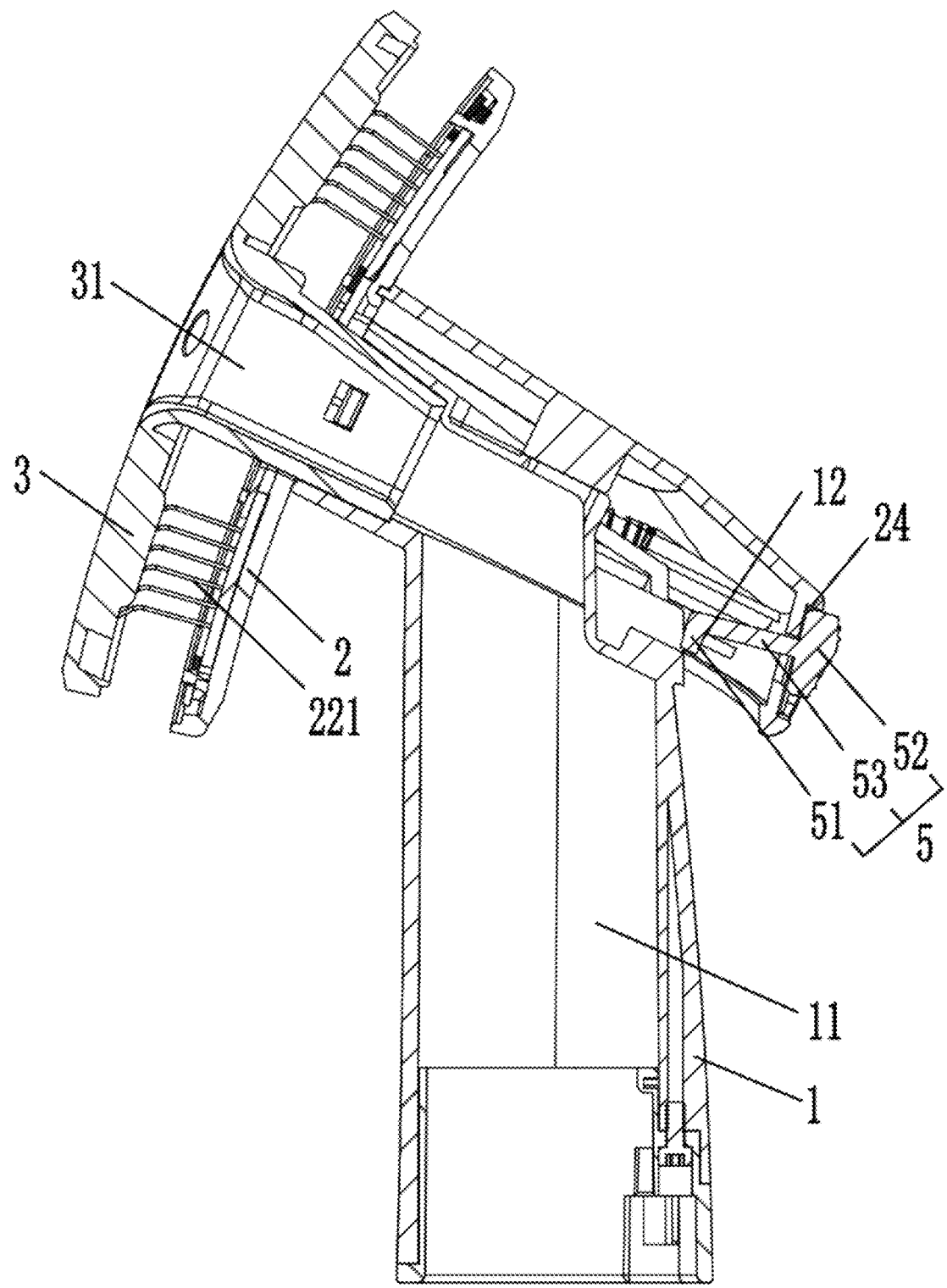
FIG. 2 is a conceptual diagram illustrating a sectional view of the present invention.
Figure 3:
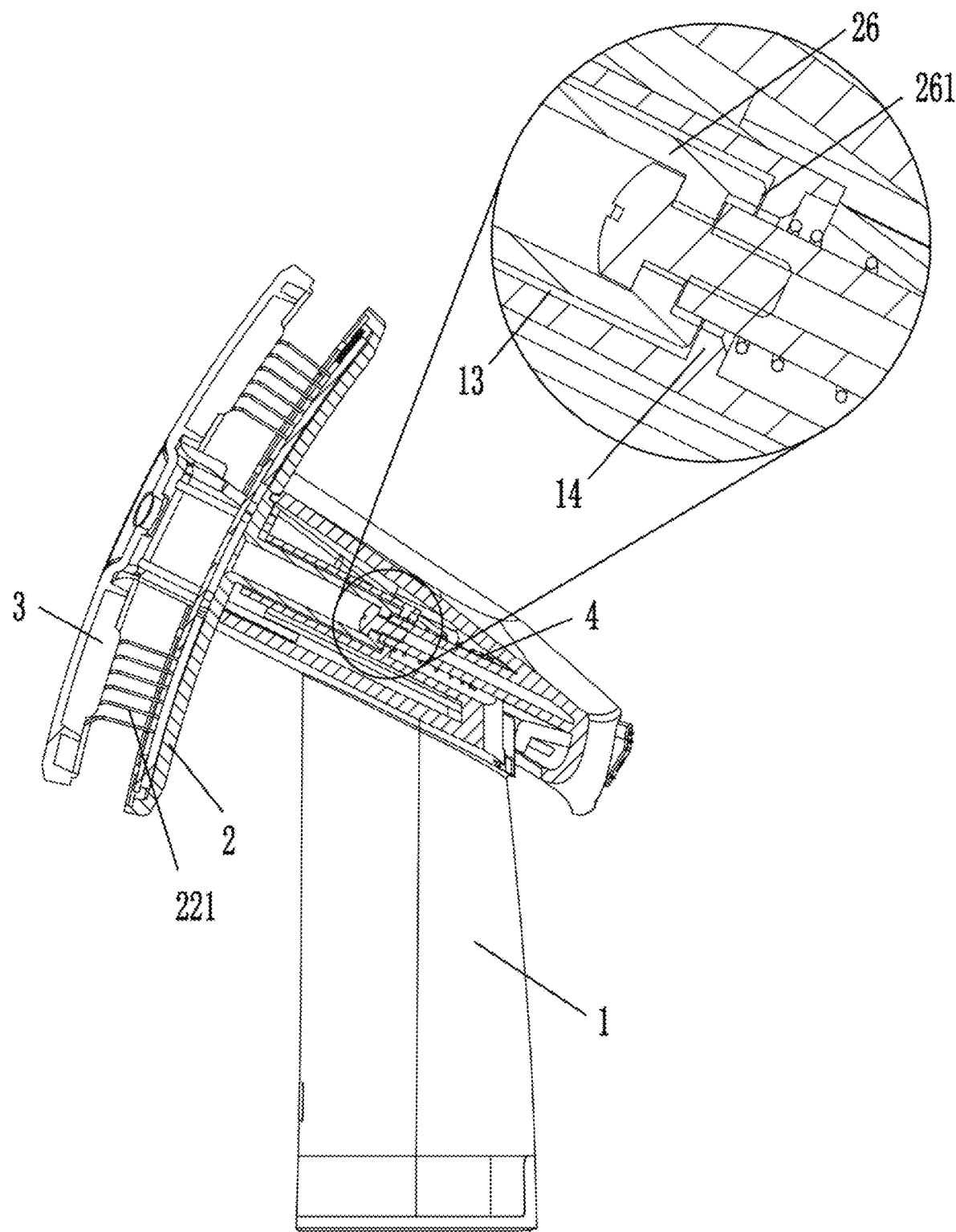
FIG. 3 is a conceptual diagram illustrating exemplary structures of the guiding column and the guiding groove.
Figure 4:
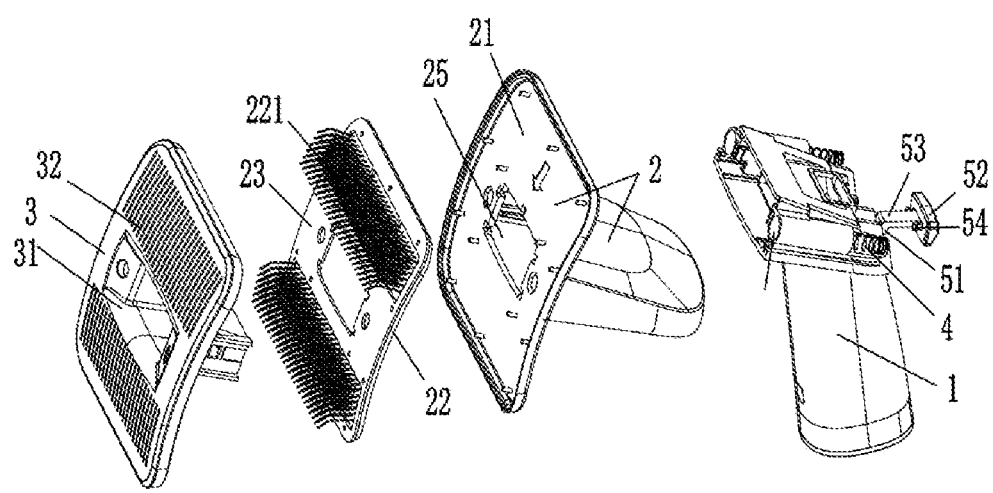
FIG. 4 is a conceptual diagram illustrating an explosive view of the present invention.
Figure 5:
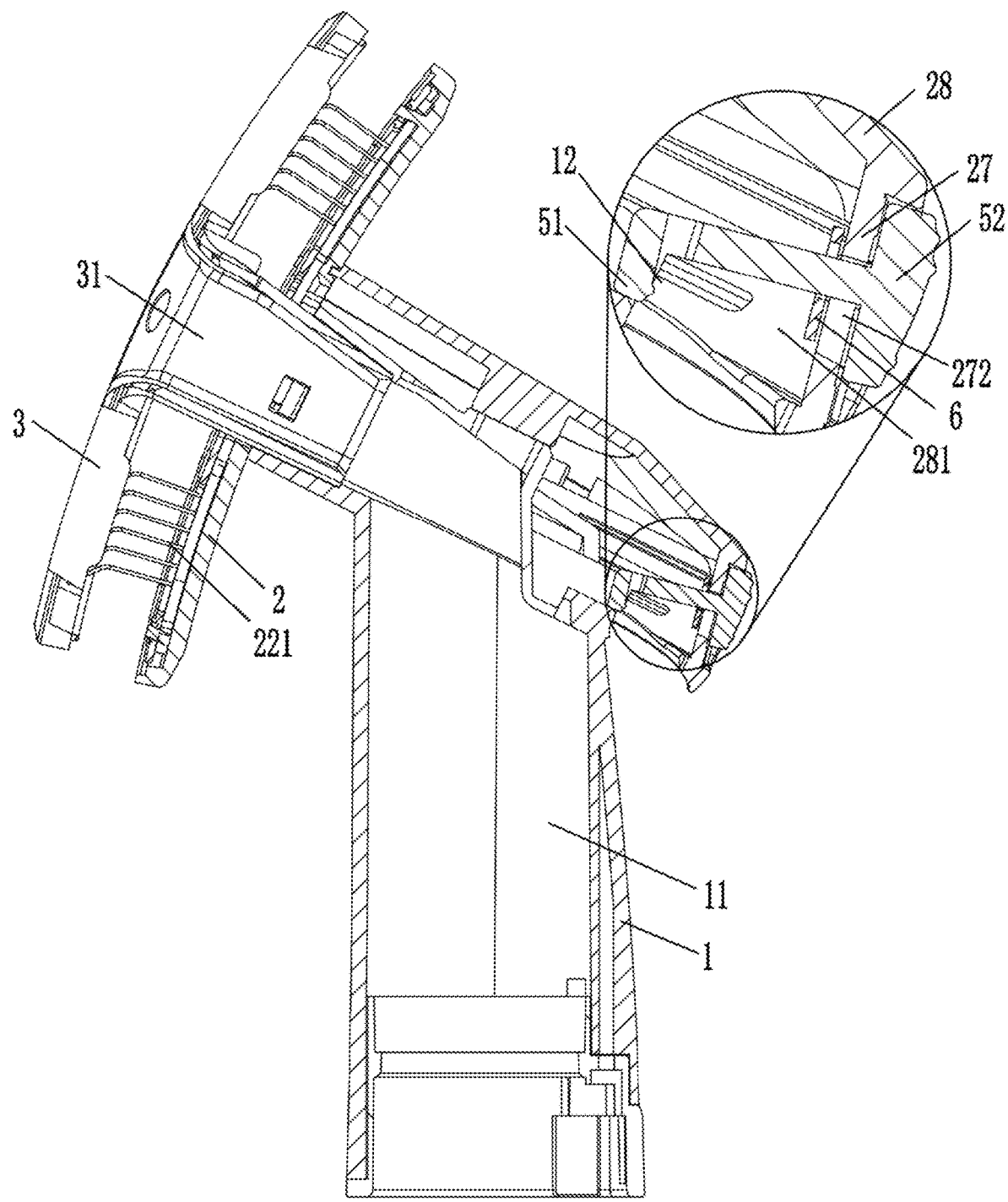
FIG. 5 is a conceptual diagram illustrating a sectional view of the present invention having a connecting plate.
Figure 6:
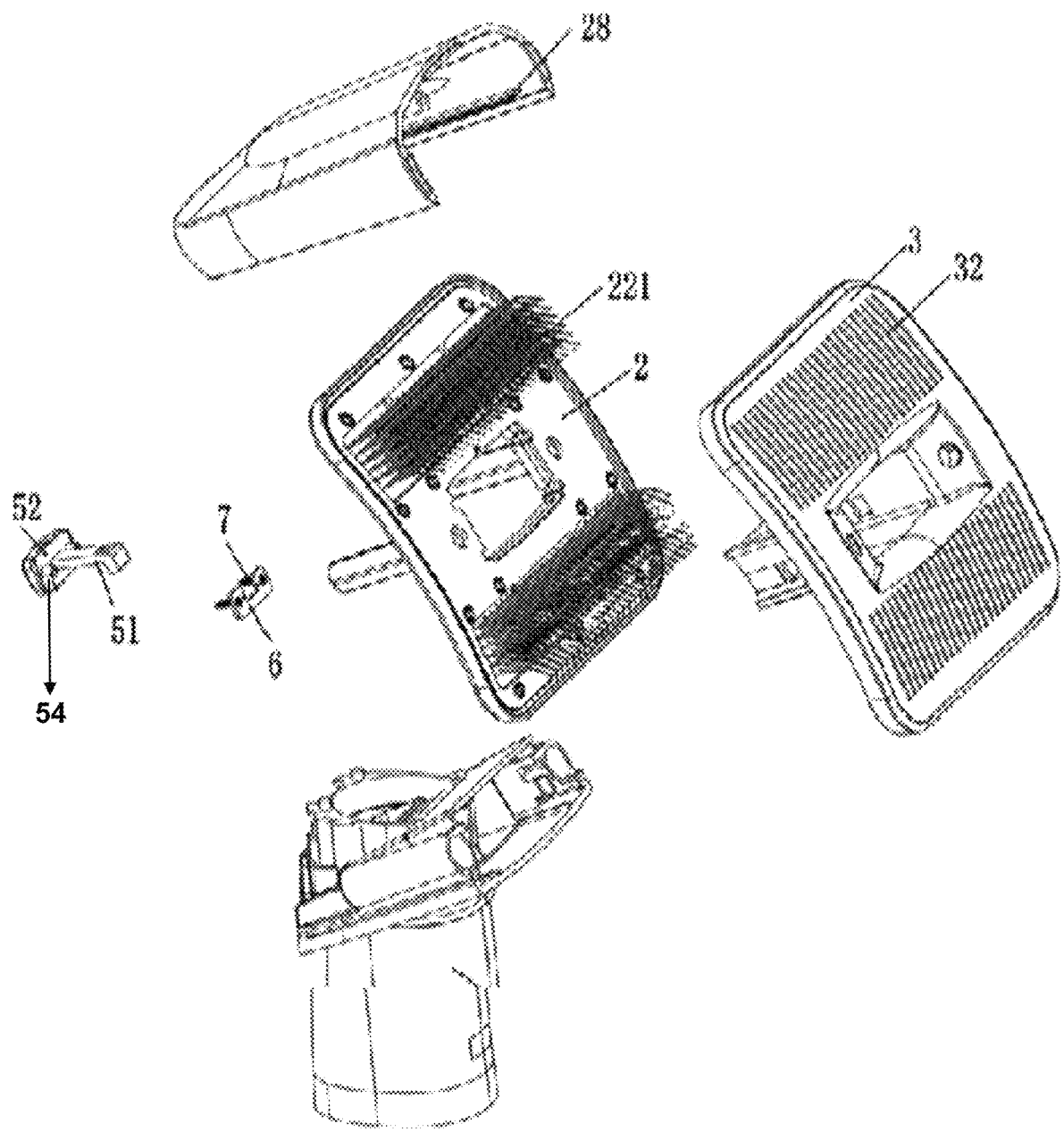
FIG. 6 is a conceptual diagram illustrating an explosive view of the present invention having a connecting plate.
Figure 7:
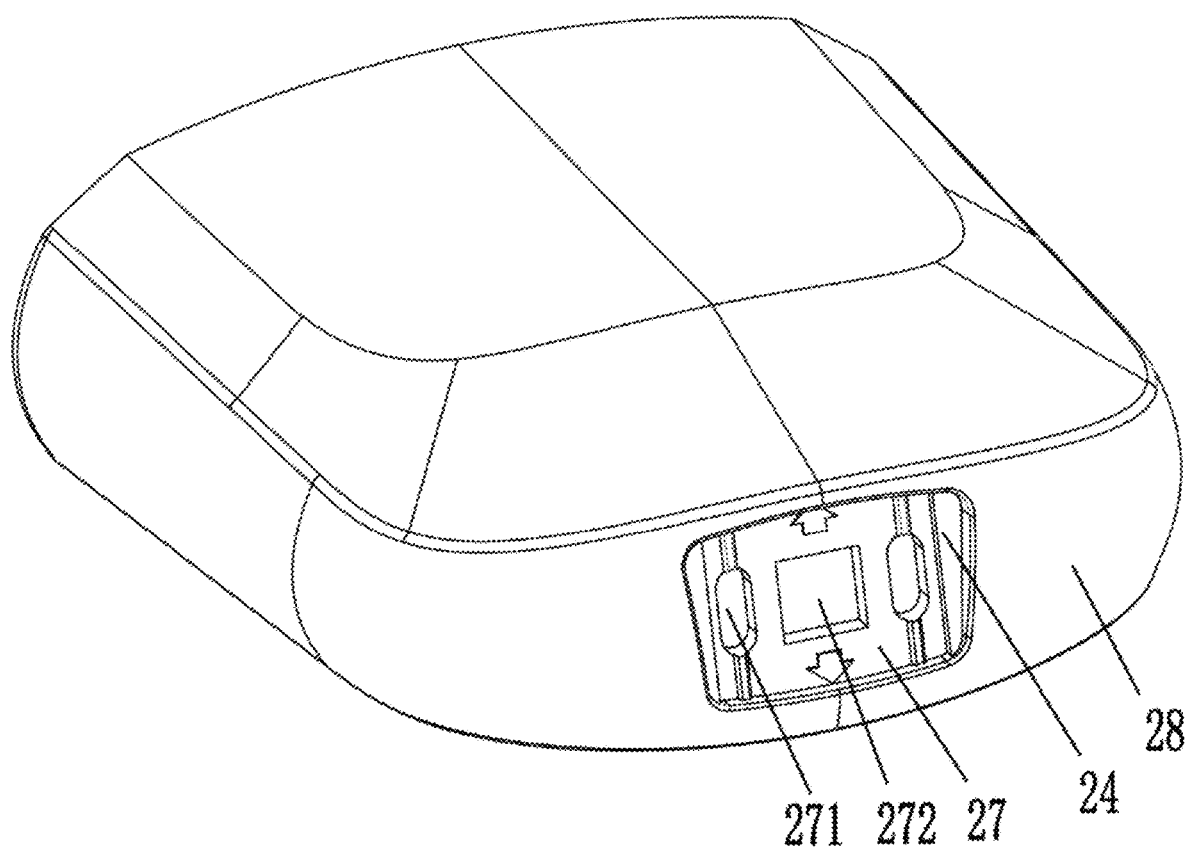
FIG. 7 is a conceptual diagram illustrating an exemplary structure of the comb frame of the present invention.

As shown in FIGS. 1-7, the combing device of the present invention comprises a comb handle 1, a comb head 2 and a protecting member 3, wherein the comb handle 1 is connected to a vacuum cleaner through a hose, an air duct 11 is arranged in the comb handle 1, and the air duct 11 is in communication with a negative pressure cavity of the hose. The comb head 2 is slidably arranged at an upper end of the comb handle 1, the comb handle 1 is provided with a first limiting structure for preventing the comb head 2 from sliding out from the comb handle 1, and the comb head 2 is provided with a plurality of groups of comb teeth 221. More specifically, guiding columns 26 are arranged on two sides of the comb head 2, and the comb handle 1 is provided with guiding grooves 13 for interacting with the guiding columns 26. Through the interaction between the guiding columns 26 and the guiding grooves 13, a sliding path when the comb head 2 slides relative to the comb handle 1 is defined, which allows the comb head 2 to slides smoothly and stably. The first limiting structure further comprises a limiting ring 14 and a limiting step 261. The limiting ring 14 is arranged in a radial direction at a position where the comb handle 1 corresponds to the guiding groove, and the guiding column 26 is provided with a limiting step 261 for interacting with the limiting ring 14.

The protecting member 3 is connected to the comb handle 1 and is arranged at the front end of a corresponding comb head 2. In the present invention, the protecting member 3 is detachably installed on the comb handle 1. The protecting member 3 is provided with an air suction port 31 in communication with the air duct 11, and the protecting member 3 is provided with a channel 32 for allowing the comb teeth 221 to pass through. In the present invention, the channel 32 is configured to be a vertical strip-shaped structure, and the width of the channel 32 is slightly greater than the outer diameter of the comb teeth 221 of the comb head 2.

An elastic member 4 is arranged between the comb handle 1 and the comb head 2. In the present invention, the elastic member 4 is sleeved on the periphery of the guiding column 26. One end of the elastic member 4 abuts against the comb handle 1, and another end of the elastic member 4 abuts against the comb head 2. The comb head 2 possesses a tendency to move away from one side of the protecting member 3 under the action of the elastic member 4, thereby allowing the comb teeth 221 to be hidden between the protecting member 3 and the comb head 2. Through the arrangement of the protecting member 3, when the combing device is no longer used, the comb teeth 221 of the comb head 2 are hidden between the protecting member 3 and the comb head 2, thereby preventing the comb teeth 221 from being bent due to collision. Thus, the functional life of the present invention is significantly prolonged.

The combing device further comprises a locking structure 5 for locking the comb head 2 at a position where the comb teeth 221 just appear from the channel 32. The locking structure 5 is provided with a push button 52. By pushing the push button to and fro, the locking and unlocking of the locking structure 5 are achieved. The locking structure 5 comprises a locking block 51, and the comb handle 1 is provided with a lock groove 12. The locking block 51 is arranged at the rear end of the comb head 2 and is capable of interacting with the locking groove 12 to lock the comb head 2 at a position where the comb teeth 221 just appear from the channel 32. More specifically, the push button 52 is connected to the locking block 51, and the rear side of the comb head 2 is provided with a push button groove 24 for interacting with the push button 52. By pushing the push button to and fro, the locking block 51 and the locking groove 12 are locked to or unlocked from each other. By means of the locking structure, when there is a need to use the combing device, the push button 52 is pushed forward to enable the locking block 51 to insert into the locking groove 12, thereby locking the comb head 2 at a position where the comb teeth 221 just appear from the channel 32. During use, the comb teeth 221 of the comb head 2 are always kept in a state of appearing from the channel 32. When the combing device is no longer used, the push button 52 is reversely pushed to enable the locking block 51 and the locking groove 12 to be unlocked from each other. In this way, the comb head 2 slides toward a side far away from the protecting member 3 under the elastic force of the elastic member 4, so that the comb teeth 221 of the comb head 2 are hidden between the protecting member 3 and the comb head 2.

The push button 52 is connected to the locking block 51 through a connecting portion 53, and the comb head 2 is provided with a via hole for allowing the connecting portion 53 to extend into the comb head 2. Two sides of the push button 52 or the connecting portion are provided with buckles 54 for interacting with end portions of the comb head 2. Through this arrangement, the push button 52 is prevented from falling out from the push button groove 24. Further, the locking structure 5 is provided with a second limiting structure for limiting the lateral movement of the push button 52 and the locking block 51. In designing the second limiting structure, the transverse width of the push button 52 may match that of the push button groove 24 or the distance between the two connection portions 53 may match the width of the via hole. Definitely, the second limiting structure may be various.

The comb head 2 comprises a mounting plate 21 and a comb base 22, wherein the comb base 22 is fixedly mounted on the mounting plate 21, and the comb teeth 221 are fixedly arranged on the comb base 22. A through hole 25 in communication with the air duct 11 is formed at a position where the mounting plate 21 and the comb base 22 correspond to the air duct 11. Further, the comb head 2 comprises a pressing plate 23, which allows the comb base 22 to be pressed on the mounting plate 21. The pressing plate 23, the comb base 22 and the mounting plate 21 are fixedly connected into a whole through fasteners. A through slot for allowing the comb teeth 221 to pass through is provided at a position where the pressing plate 23 corresponds to the comb teeth 221.

Normally, the comb teeth 221 are capable of smoothly combing hair. When there is a need to remove the residual hair wound among the comb teeth 221, the push button 52 is pushed such that the locking block 51 and the locking groove 12 are unlocked from each other. At this point, the comb head 2 reciprocates relative to the comb handle 1 and the protecting member 3 under the elastic force of the elastic member 4, thereby enabling the residual hair wound on the comb teeth 221 to be removed by the protecting member 3 through the reciprocating movement of the comb head 2. Thus, a convenient removal of residual hair is achieved.

In some embodiments, a mounting panel 27 is arranged at a position where the comb head 2 corresponds to the push button 52. A connecting plate 6 is arranged on an inner side of the mounting panel 27, and the connecting plate 6 is fixedly connected to the push button 52 located on an outer side of the mounting panel 27 by means of a fastening member 7. Thus, the mounting panel 27 is limited between the connecting plate 6 and the push button 52. The mounting panel 27 is provided with a first avoiding groove 271 for allowing the fastening member 7 to slide and a second avoiding groove 272 for allowing the locking block 51 to slide. In this embodiment, the connecting plate 6 is made of a metal or plastic material, such as an iron block or a plastic block, etc. Limiting the connecting plate 6 and the push button 52 on the inner and outer sides of the mounting panel 27 achieves the following benefits: 1. the push button 52 is effectively prevented from moving along a direction perpendicular to the sliding direction; 2. the push button 52 is prevented from falling out from the push button groove 24; 3. the damping value when the push button 52 is pushed is increased, avoiding the push button 52 from being pushed freely, namely, avoiding the push button 52 from being pushed mistakenly.

More specifically, the comb head 2 is provided with a comb frame 28 arranged at an upper end of the comb handle 1, and a sliding gap 281 is formed between the rear side of the comb handle 1 and the comb frame 28. The sliding gap 281 is isolated from the channel 32, thereby allowing the comb head 2 to slide relative to the comb handle 1. The push button 52 is arranged on the rear side of the comb frame 28, the push button groove 24 is formed in an outer side of the mounting panel 27, and the push button 52 is slidably arranged in the push button groove 24. Two groups of connecting columns 55 are symmetrically arranged on an inner side of the push button 52, and threaded holes are formed in the connecting columns 55. The connecting plate 6 is connected in the threaded hole through the fastening member 7 such that the connecting plate 6 is connected to the push button 52. The outer diameter of the connecting column 55 matches the width of the first avoiding groove 271, thus making the push button 52 slide smoothly and stably.

The above are merely preferred embodiments of the present invention. Therefore, equivalent changes or modifications made according to the structures, features and principles described in the specification of the present invention shall fall into the scope defined by the claims of the present invention.

What is claimed is:

1. A combing device, comprising:
   a comb handle (1),
   a comb head (2),
   a protecting member (3), wherein an air duct (11) is arranged in the comb handle (1), wherein the comb head (2) is slidably arranged at an upper end of the comb handle (1), wherein the comb head (2) is provided with a first limiting structure for preventing the comb head (2) from sliding out from the comb handle (1), and
   the comb head (2) is provided with a plurality of groups of comb teeth (221) and a via hole,
   wherein the protecting member (3) is connected to the comb handle (1) and is arranged at a front end of a corresponding comb head (2),
   wherein the protecting member (3) is provided with an air suction port (31) connected to the air duct (11), and
   the protecting member (3) is provided with a channel (32) for allowing the comb teeth (221) to pass through,
   wherein an elastic member (4) is arranged between the comb handle (1) and the comb head (2),
   wherein the comb head (2) possesses a tendency to move away from one side of the protecting member (3) under the action of the elastic member (4), thereby allowing the comb teeth (221) to be hidden between the protecting member (3) and the comb head (2), and a locking structure (5) for locking the comb head (2) at a position where the comb teeth (221) penetrate the channel (32),
   wherein the locking structure (5) includes:
      a push button (52);
      a locking block (51); and
      a connecting portion (53), wherein the push button (52) is connected to the locking block (51) through the connecting portion (53) in a manner that one end of the connecting portion (53) is directly attached to the push button (52) and another end of the connecting portion (53) is directly attached to the locking block (51), wherein the via hole of the comb head (2) allows the connecting portion (53) to extend into the comb head (2), wherein a width of the via hole is same as a width of the connecting portion (53) for limiting the lateral movement of the push button (52) and the locking block (51), and wherein through a reciprocating movement of the push button (52), the locking and unlocking of the locking structure(S) is achieved.

2. The combing device of claim 1, wherein the comb head (2) is provided with a lock groove (12), wherein the locking block (51) is arranged at a rear end of the comb head (2) and is capable of interacting with the locking groove (12) to lock the comb head (2) at a position where the comb teeth (221) penetrate the channel (32).

3. The combing device of claim 2, wherein a mounting panel (27) is arranged at a rear surface of the comb head (2), wherein a connecting plate (6) is arranged on an inner side of the mounting panel (27), and the connecting plate (6) is fixedly connected to the push button (52) located on an outer side of the mounting panel (27) by means of a fastening member (7), which allows the mounting panel (27) to be limited between the connecting plate (6) and the push button (52), wherein the mounting panel (27) is provided with a first groove (271) and a second groove (272) for allowing the locking block (51) to slide with the limiting ring (14) in a limiting manner.

4. The combing device of claim 1, wherein the push button (52) is connected to the locking block (51), and a rear side of the comb head (2) is provided with a push button groove (24) for interacting with the push button (52) in a sliding manner, wherein through the reciprocating movement of the push button (52), the locking block (51) and the locking groove (12) are locked to or unlocked from each other.

5. The combing device of claim 4, wherein a mounting panel (27) is arranged at a position where the comb head (2) corresponds to the push button (52), wherein a connecting plate (6) is arranged on an inner side of the mounting panel (27), and the connecting plate (6) is fixedly connected to the push button (52) located on an outer side of the mounting panel (27) by means of a fastening member (7), which allows the mounting panel (27) to be limited between the connecting plate (6) and the push button (52), wherein the mounting panel (27) is provided with a first groove (271) and a second groove (272) for allowing the locking block (51) to slide.

6. The combing device of claim 1, wherein the comb head (2) further comprises:
a mounting plate (21) and a comb base (22), wherein the comb base (22) is fixedly mounted on the mounting plate (21), and the comb teeth (221) are fixedly arranged on the comb base (22), wherein a through hole (25) connected to the air duct (11) is formed at a position where the mounting plate (21) and the comb base (22) correspond to the air duct (11).

7. The combing device of claim 6, wherein the comb head (2) further comprises:
a pressing plate (23), which allows the comb base (22) to be pressed on the mounting plate (21), wherein the pressing plate (23), the comb base (22) and the mounting plate (21) are fixedly connected together through fasteners, wherein a through slot for allowing the comb teeth (221) to pass through is provided at a position where the pressing plate (23) corresponds to the comb teeth (221).

8. The combing device of claim 1, wherein guiding columns (26) are arranged on two sides of the comb head (2), and the comb handle (1) is provided with guiding grooves (13) for interacting with the guiding columns (26), wherein through the interaction between the guiding columns (26) and the guiding grooves (13), a sliding path when the comb head (2) slides relative to the comb handle (1) is defined.

9. The combing device of claim 8, wherein the elastic member (4) is sleeved on the periphery of the guiding column (26), wherein one end of the elastic member (4) is adjacent to the comb handle (1), and another end of the elastic member (4) is adjacent to the comb head (2).

10. The combing device of claim 8, wherein the first limiting structure further comprises:
a limiting ring (14) and a limiting step (261), wherein the limiting ring (14) is arranged in a radial direction at a position where the comb handle (1) corresponds to the guiding groove, and the guiding columns (26) is provided with a limiting step (261) for interacting with the limiting ring (14) in a limiting manner.

\* \* \* \* \*